(12) United States Patent
Chabot et al.

(10) Patent No.: US 10,473,859 B2
(45) Date of Patent: Nov. 12, 2019

(54) FIBER OPTIC CONNECTOR

(71) Applicant: BELDEN CANADA INC., Saint Laurent, QC (CA)

(72) Inventors: Bruno Chabot, Montreal (CA); David Hubbard, Sunnyvale, CA (US)

(73) Assignee: Belden Canada Inc., Saint-Laurent (CA)

( * ) Notice: Subject to any disclaimer, the term of this patent is extended or adjusted under 35 U.S.C. 154(b) by 11 days.

(21) Appl. No.: 15/482,981

(22) Filed: Apr. 10, 2017

(65) Prior Publication Data

US 2018/0011262 A1 Jan. 11, 2018

Related U.S. Application Data

(60) Provisional application No. 62/320,425, filed on Apr. 8, 2016.

(51) Int. Cl.
*G02B 6/38* (2006.01)
*G02B 6/255* (2006.01)

(52) U.S. Cl.
CPC ......... *G02B 6/2551* (2013.01); *G02B 6/2558* (2013.01); *G02B 6/3846* (2013.01); *G02B 6/3887* (2013.01); *G02B 6/3893* (2013.01); *G02B 6/3894* (2013.01)

(58) Field of Classification Search
CPC .. G02B 6/2551; G02B 6/3846; G02B 6/3887; G02B 6/3893; G02B 6/3894
See application file for complete search history.

(56) References Cited

U.S. PATENT DOCUMENTS

| | | | | |
|---|---|---|---|---|
| 4,274,708 A * | 6/1981 | Cocito | ................. | G02B 6/3806 385/95 |
| 4,353,619 A * | 10/1982 | Parr | ..................... | G02B 6/3806 385/64 |
| 4,741,591 A * | 5/1988 | Grabbe | ................ | G02B 6/2555 385/70 |
| 5,201,019 A * | 4/1993 | Gallusser | ............. | G02B 6/3801 385/136 |
| 6,350,065 B1 * | 2/2002 | Arima | .................. | G02B 6/3806 385/70 |
| 6,550,985 B2 * | 4/2003 | Nakamura | ........... | G02B 6/2551 385/96 |
| 2004/0200047 A1 * | 10/2004 | Sanders | ................ | B65H 69/02 28/172.1 |

\* cited by examiner

*Primary Examiner* — Daniel Petkovsek

(57) ABSTRACT

A fiber optic connector comprising a fusion assembly for strengthening a splice point. The fusion assembly comprises an elongate mechanical support positioned adjacent the splice point and snugly encased by a flexible tube. In one embodiment, a meltable adhesive in the form of a hollow tube is positioned over the splice point and the flexible tube comprises a heat shrinkable material. In another embodiment, the mechanical support is an elongate plate having a concave surface positioned adjacent the splice point and a C shaped cross section.

10 Claims, 6 Drawing Sheets

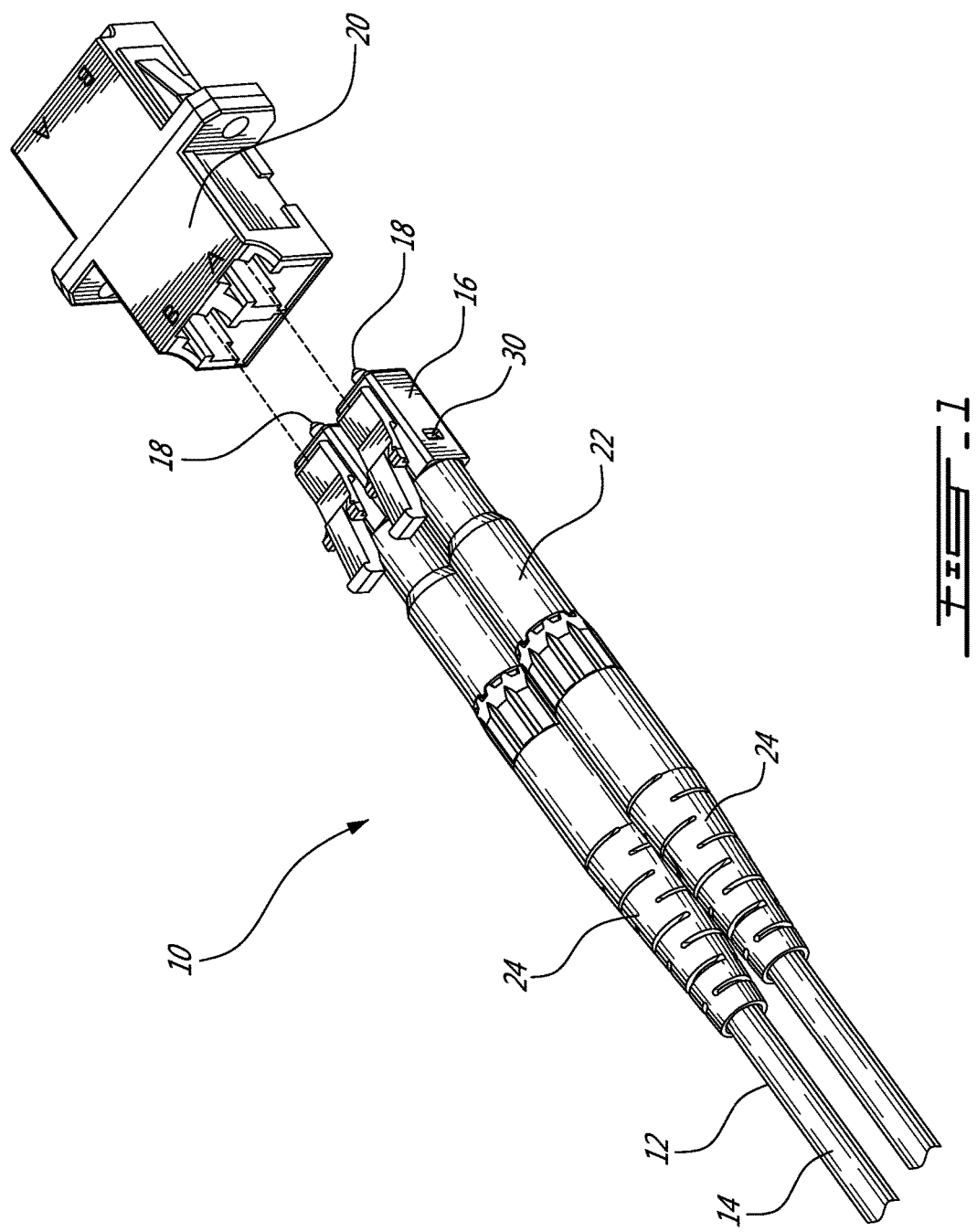

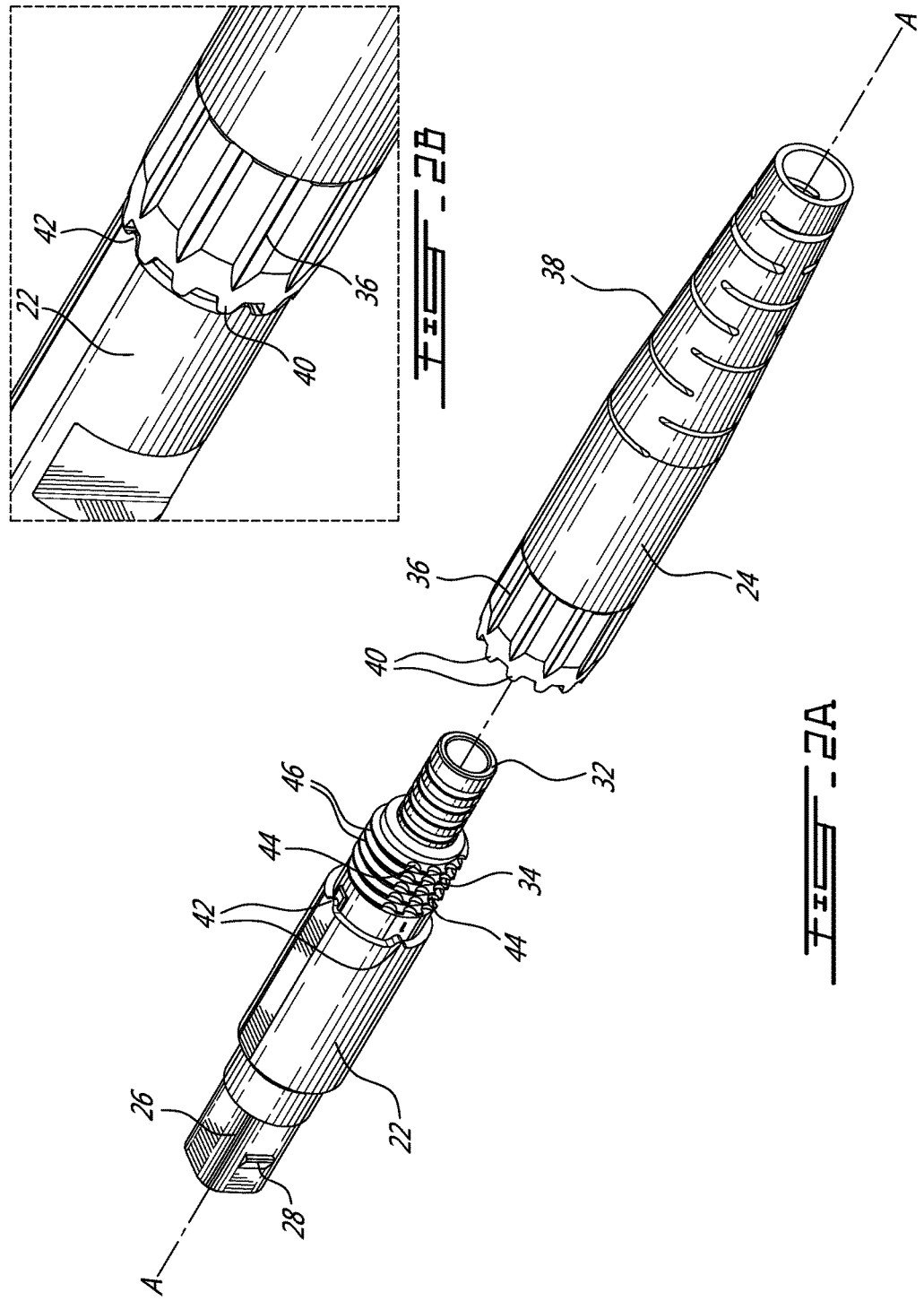

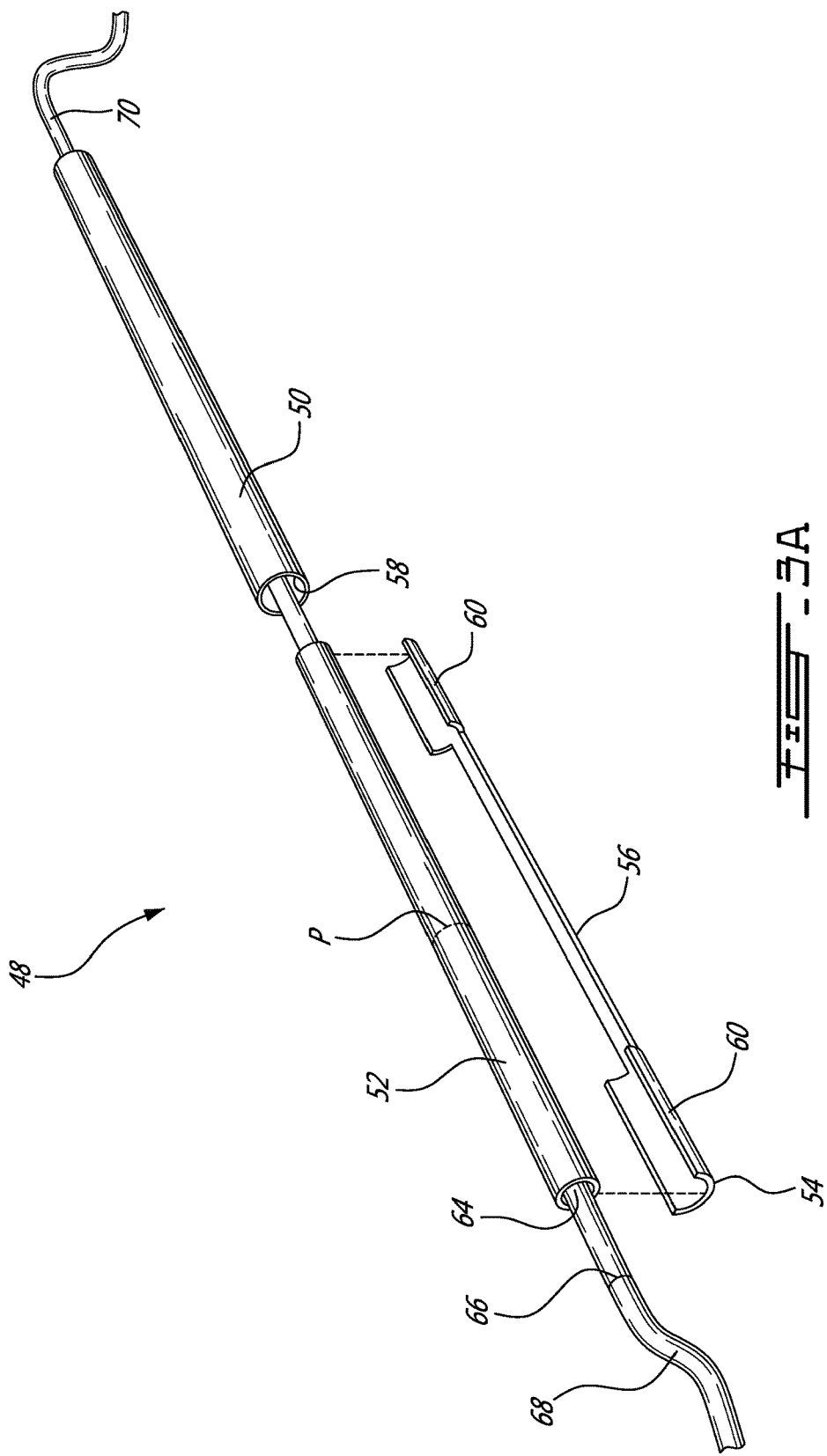

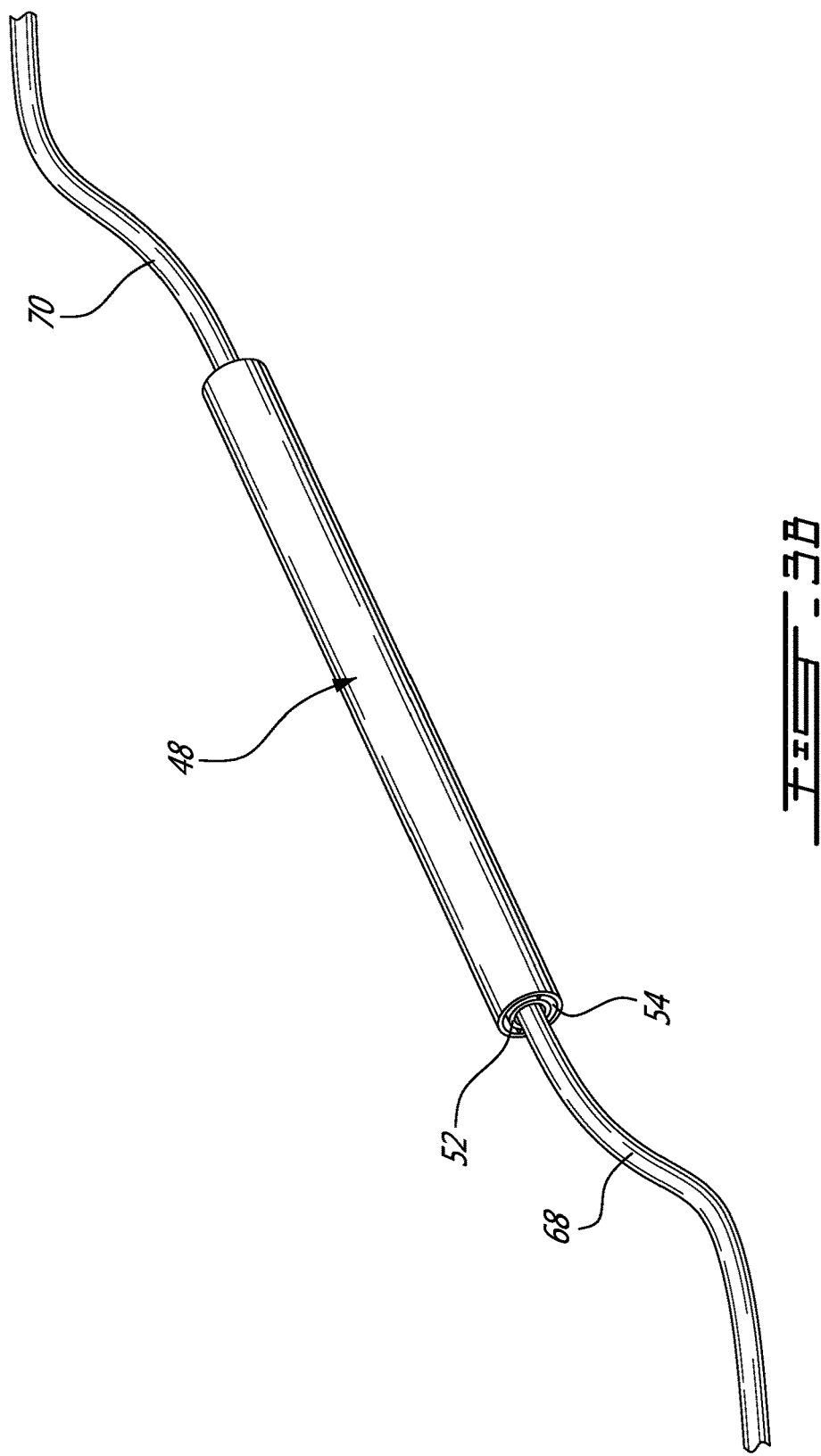

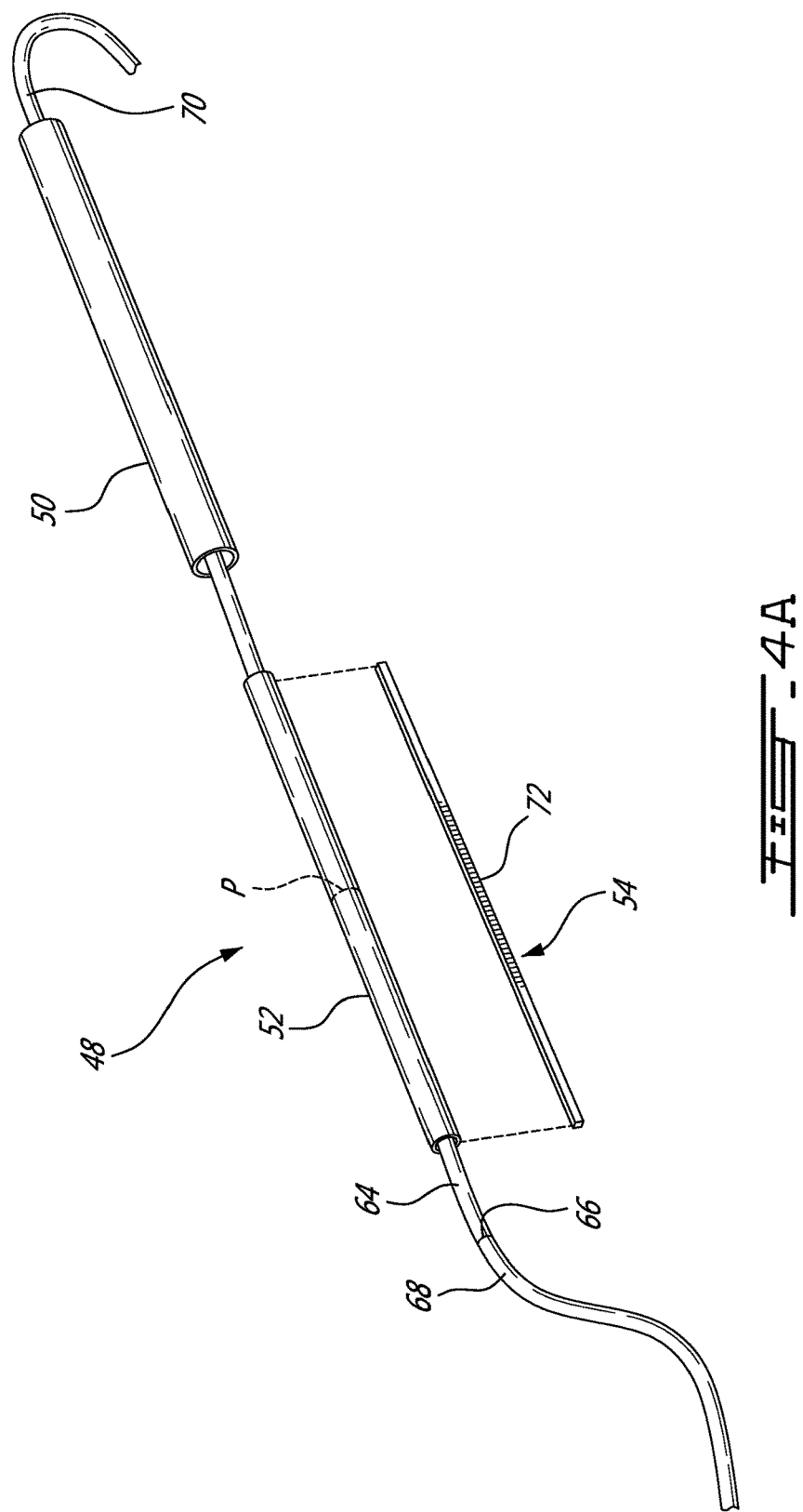

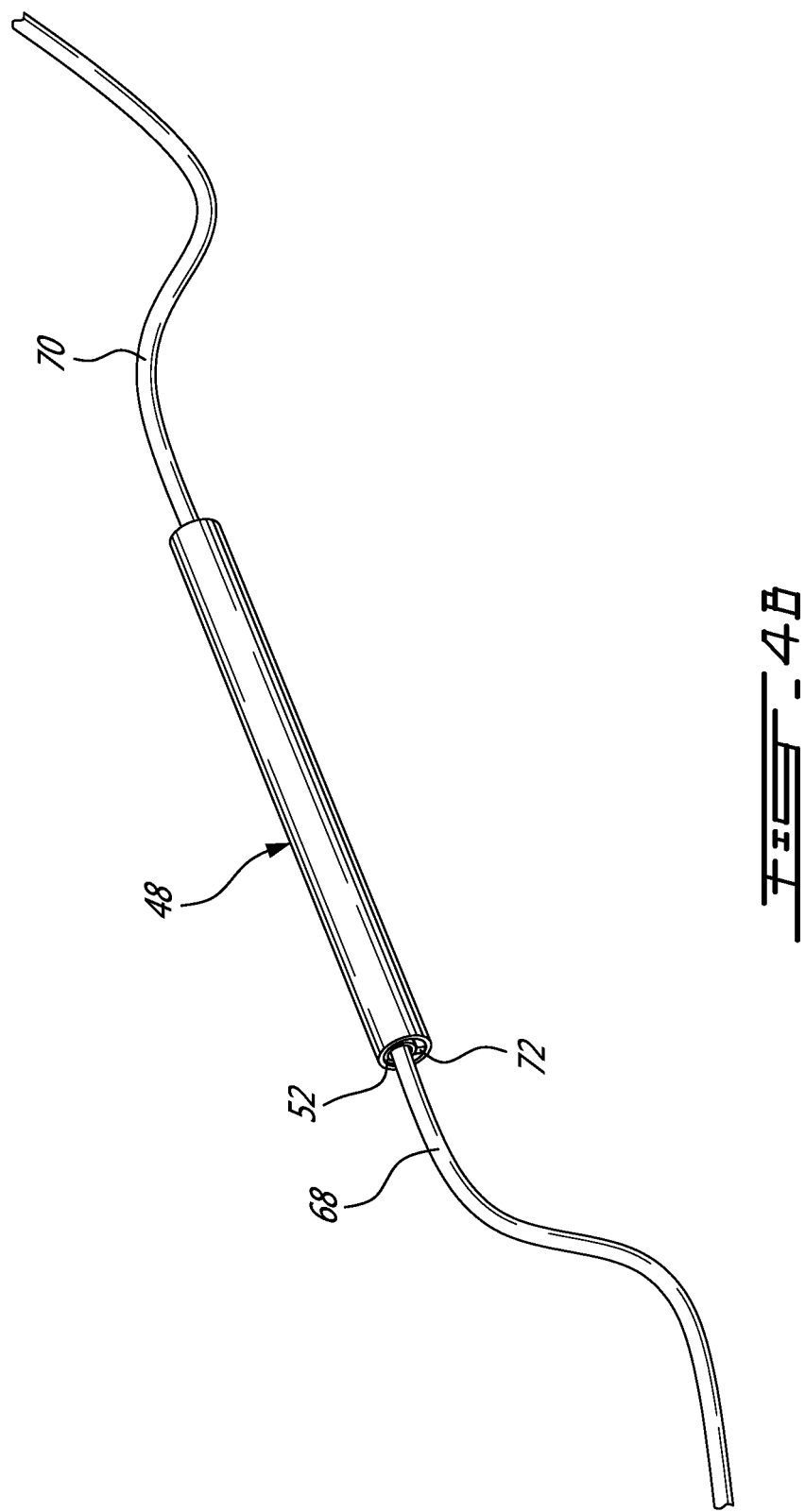

FIBER OPTIC CONNECTOR

CROSS REFERENCE TO RELATED APPLICATIONS

This application claims priority under 35 USC § 119(e) of U.S. provisional application Ser. No. 62/320,425. All documents above are incorporated herein in their entirely by reference.

FIELD OF THE INVENTION

The present invention relates to a fiber optic connector.

BACKGROUND TO THE INVENTION

The prior art discloses fiber optic connectors terminated by a ferrule and comprising a fiber optic stub spliced to a stripped end of an optic fiber. One drawback of these fiber optic devices is that the splice point between the stub and the stripped end are relatively weak and can become damaged by in advertent bending or by pulling on the fiber optic cable.

SUMMARY OF THE INVENTION

In order to address the above and other drawbacks there is provided A fiber optic connector assembly. The assembly comprises a fiber optic stub terminated at a first end by a ferrule and a second end spliced at a splice point to a length of fibre optic cable, a mechanical support comprising at least one of a square bar and an elongate plate positioned in parallel and adjacent to the stub and the fiber optic cable straddling the splice point, the elongate plate comprising a concave inner surface conforming substantially to an outer surface of the stub and the fiber optic cable, and an elongate flexible tube completely and snugly encasing the mechanical support and the stub and the fiber optic cable adjacent the mechanical support.

There is also provided a method of assembling a fiber optic connector comprising splicing a second end of a fiber optic stub to a stripped end of a fiber optic cable at a splice point, a first end of the stub terminated by a ferrule, positioning a mechanical support comprising one of an elongate square bar and an elongate plate comprising a concave surface adjacent the stub and the fiber optic cable straddling the splice point, and snugly surrounding the mechanical support with a flexible tube.

Additionally, there is provided a fiber optic connector for terminating a fiber optical cable assembly comprising a fiber optic cable, a plurality of elongate strengthening strands positioned along the fiber optic cable and a cable jacket covering the fiber optic cable and the strengthening strands, the connector comprising: a fiber optic stub terminated at a first end by a ferrule and spliceable at a second end to a stripped end of the fibre optic cable, a housing for receiving the fiber optic stub at a first end and the fiber optic cable at a second end, the housing second end comprising a threaded outer surface and a plurality of strand receiving grooves intersecting the threaded outer surface and arranged substantially in parallel to a housing axis, and an elongate flexible boot comprising a first end comprising a threaded inner surface configured for engagement with the threaded outer surface, wherein the strengthening strands are retained within the plurality of strand receiving grooves by the threaded inner surface.

BRIEF DESCRIPTION OF THE DRAWINGS

FIG. 1 is a perspective view of a pair of fiber optic connectors in accordance with an illustrative embodiment of the present invention;

FIGS. 2A and 2B are perspective views of a fusion splice in accordance with an illustrative embodiment of the present invention;

FIG. 3A is an exploded perspective view of a middle portion of a fiber optic connector and duplex clip in accordance with an illustrative embodiment of the present invention;

FIG. 3B is a perspective view of an assembled middle portion of a fiber optic connector and duplex clip in accordance with an illustrative embodiment of the present invention;

FIG. 4A is an exploded perspective view of a middle portion of a fiber optic connector and duplex clip in accordance with an alternative illustrative embodiment of the present invention; and FIG. 4B is a perspective view of an assembled middle portion of a fiber optic connector and duplex clip in accordance with an alternative illustrative embodiment of the present invention.

DETAILED DESCRIPTION OF THE ILLUSTRATIVE EMBODIMENTS

Referring now to FIG. 1, a fiber optic connector in accordance with an illustrative embodiment of the present invention, and generally referred to using the reference numeral 10, will now be described. The fiber optic connector 10 is generally configured to, as will be described in more detail hereinbelow, terminate an optic fiber cable 12 comprising an optic fiber (not shown) surrounded by a cable jacket 14. Strands of strengthening yarn (also not shown) such as fabricated from aramid or Kevlar or the like are provided between the optic fiber and jacket 14. The connector 10 comprises a plug portion 16, illustratively an LC compatible plug portion, comprising a ferrule 18 (shown covered) and suitable for insertion into an LC compatible receptacle 20. The connector 10 further comprises a middle portion 22, as will described in more detail below, a fusion splice (not shown) and a boot portion 24 which engages with the jacket 14 and aramid strands of the fiber optic cable 12 to provide a robust interconnection. Although an LC compatible plug and receptacle have been used in this illustrative embodiment, a person of ordinary skill in the art will now understand that other single fiber technologies, such as SC and ST could also be used. Additionally, and in a particular embodiment, a fiber optic cable comprised of a plurality of optic fibers and a multifibre compatible plug and receptacle such as MPO could be used.

Referring now to FIGS. 2A and 2B in addition to FIG. 1, the middle portion 22 comprises a first end 26 which engages the plug portion 16, for example through the provision of tabs 28 which engage complementary slots 30 in the plug portion 16, and a second end 32 comprising a threaded outer surface 34 which mates with a complementary threaded ring 36 on the boot portion 24. The boot portion 24 further comprises a tapered flexible boot 38 which, when assembled, covers an end portion of the optic fiber cable 12. The threaded ring 36 is rotatable versus the tapered boot 38 and such that it can be easily threaded onto the threaded outer surface 34. The threaded ring 36 further comprises a plurality of teeth 40 which, when threaded onto the threaded outer surface 34, engage complementary teeth 42 on the middle portion 22, thereby preventing the threaded ring 36 from inadvertently being unthreaded. Additionally, a series of grooves 44 arranged lengthwise intersect the threads 46 of the threaded outer surface 34 and such that the strands of aramid yarn (not shown) are received therein. The grooves 44 accept strands of the yarn preventing them from being twisted while the threaded ring 36 is being mated with the threaded outer surface 34 which otherwise might rotate the optic fiber causing it to break or become distorted.

Referring to FIG. 3A in addition to FIGS. 2A and 2B, in a first embodiment the middle portion 22 houses a fusion splice 48 comprising a shrinkable outer tube 50 housing an inner tube 52 fabricated from an adhesive. Illustratively the outer tube 50 is heat shrinkable and the inner the 52 manufactured from a material which melts when heated, and a mechanical support 54. The support 54 illustratively comprises an elongate plate 56 manufactured from a rigid yet slightly bendable material such as metal or the like and having a concave cross section and which conforms generally to the inner surface 58 of the shrinkable tube 50. Illustratively, in one embodiment the elongate plate 56 comprises generally in cross section C shaped embossments 60 at either end for improving mechanical strength while the thinner mid-section 54 insures a tight fit about the centre point P.

Still referring to FIG. 3A, in use, in order to assemble the fusion splice 48 an optic fiber 64 comprising a splice point 66 is inserted into the inner tube 52 and the splice point 66 arranged so it is positioned adjacent the centre point P. In this regard, the splice point is between a stub portion 68 which is terminated at a distal end by the ferrule (reference 18 in FIG. 1) and a second length of fiber optic cable 70. The support 54 is placed adjacent and in parallel to the inner tube 52 and this subassembly inserted into the shrinkable outer tube 50 (FIG. 3B). In a particular embodiment, the assembly is then lightly heated such that the shrinkable outer tube 50, manufactured from a heat shrinkable material, shrinks and the inner tube 52 melts. The mechanical support 54 provides for increased mechanical strength and in combination with the other components of the fusion splice 48 results in a robust assembly.

Referring back to FIG. 3A, in particular embodiment the fusion splice 48 comes preassembled with the inner tube 52 and mechanical support 54 within the shrinkable outer tube 50. On assembly, the second length optic fiber 70 is inserted into the inner tube 52, spliced to the stub portion 68 and then retracted into the inner tube 52 until the splice point 66 is positioned adjacent the centre point P. The shrinkable outer tube 50 is then shrunk, for example through the application of heat, to complete the assembly.

Referring back to FIGS. 2A and 2B, the resultant the fusion splice 48 is positioned within the housing 22 along the axis A-A with the Kevlar/aramid yarn strengthening strands positioned within the grooves 44. The boot 24 is then threaded onto the rearward end of the housing until the teeth 40 are engaged by the complementary teeth 42 on the housing 22.

Referring now to FIG. 4A, in an alternative embodiment of the fusion splice 48, the mechanical support 54 comprises a bar 72, such as a square metal wire or glass bar. Illustratively, the bar 72 is of a square shaped cross section.

Still referring to FIG. 4A, during assembly of the fusion splice 48 the optic fiber 64 comprising the splice point 66 is inserted into the inner tube 52 and the splice point 66 arranged so it is positioned adjacent the centre point P. In this regard, the splice point is between the stub portion 68 which is terminated at a distal end by the ferrule (reference 18 in FIG. 1) and the second length of fiber optic cable 70. The bar 72 is placed adjacent and in parallel to the inner tube 52 and this subassembly inserted into the heat shrinkable outer tube 50 (FIG. 4B). The assembly is then lightly heated such that the heat shrinkable outer tube 50 shrinks and the inner tube 52 melts. The bar 72 provides for increased mechanical strength and in combination with the other components of the fusion splice 48 results in a robust assembly.

Although the present invention has been described herein above by way of specific embodiments thereof, it can be modified without departing from the spirit and nature of the subject invention as defined in the appended claims.

We claim:
1. A fiber optic connector assembly comprising:
a fiber optic stub terminated at a first end by a ferrule and a second end spliced at a splice point to a length of fiber optic cable;
a mechanical support comprising an elongate plate positioned in parallel and adjacent to said stub and said fiber optic cable, said elongate plate comprising a concave inner surface comprising an inner radius conforming to an outer radius of said stub and said fiber optic cable at said splice point, said mechanical support straddling said splice point; and
an elongate flexible tube completely encasing said mechanical support and said stub and said fiber optic cable adjacent said mechanical support.
2. The fiber optic connector assembly of claim 1, wherein said elongate flexible tube comprises a heat shrinkable material.
3. The fiber optic connector assembly of claim 1, further comprising a layer of adhesive material on an outer surface of said second end and said length of fiber optic cable at said splice point and such that, when assembled, said adhesive forms a layer between said mechanical support and said stub and said fiber optic cable.
4. The fiber optic connector assembly of claim 3, wherein said adhesive material comprises a thermal adhesive.
5. The fiber optic connector assembly of claim 4, wherein said thermal adhesive comprises a tube, said tube placed about said second end and said length of fiber optic cable at said splice point.
6. The fiber optic connector assembly of claim 1, wherein said elongate plate is terminated at either end by an embossment comprising a C-shaped cross section, each embossment comprising a concave inner surface comprising an inner radius conforming to an outer surface of said second end and said length of fiber optic cable at said splice point.
7. A fiber optic connector assembly comprising:
a fiber optic stub terminated at a first end by a ferrule and a second end spliced at a splice point to a length of fibre optic cable;
a mechanical support comprising a square bar positioned in parallel and adjacent to said stub and said fiber optic cable, said mechanical support straddling said splice point; and
an elongate flexible tube completely encasing said mechanical support and said stub and said fiber optic cable adjacent said mechanical support.
8. The fiber optic connector assembly of claim 7, wherein said elongate flexible tube comprises a heat shrinkable material.
9. The fiber optic connector assembly of claim 7, further comprising a layer of adhesive material between said mechanical support and said stub and said fiber optic cable.

10. The fiber optic connector assembly of claim 9, wherein said adhesive material comprises a thermal adhesive.

* * * * *